United States Patent [19]
Foster et al.

[11] 4,335,468
[45] Jun. 15, 1982

[54] SIMULTANEOUS TRANSMISSION SIGNAL DETECTION SYSTEM

[76] Inventors: George B. Foster, 7140 Linworth Rd., Worthington, Ohio 43085; David E. Harris, 193 Clinton Hts., Columbus, Ohio 43202

[21] Appl. No.: 110,623

[22] Filed: Jan. 9, 1980

Related U.S. Application Data

[63] Continuation-in-part of Ser. No. 928,825, Jul. 28, 1978, abandoned.

[51] Int. Cl.³ .............................................. H04B 1/44
[52] U.S. Cl. ...................................... 455/67; 455/58; 455/78
[58] Field of Search ................... 455/58, 78, 83, 229, 455/69, 155, 159, 67; 179/2 EA, 84 B; 370/31, 32

[56] References Cited
U.S. PATENT DOCUMENTS

| | | | |
|---|---|---|---|
| 2,501,986 | 3/1950 | Brockman | 455/58 |
| 2,900,499 | 8/1959 | Blasbalg | 455/159 |
| 2,939,139 | 5/1960 | Handler | 455/78 |
| 3,394,311 | 7/1968 | Pursley | 455/78 |
| 3,469,191 | 9/1969 | Russell, Jr. et al. | 455/78 |
| 3,988,675 | 10/1976 | Dykas | 455/78 |
| 4,013,959 | 3/1977 | Patterson | 455/58 |
| 4,037,158 | 7/1977 | Eastmond | 455/69 |
| 4,128,810 | 12/1978 | Ogita | 455/155 |

*Primary Examiner*—Gerald L. Brigance
*Attorney, Agent, or Firm*—Larry S. Nixon

[57] ABSTRACT

In a communication system wherein multiple radio stations communicate with one another over a single channel, an arrangement for indicating to a first user who is transmitting over the channel that there is a simultaneous transmission occurring on the channel by another user, possibly blocking or interferring with transmission by the first user. The arrangement includes means for periodically causing the transmitting first radio station to reduce its transmitting power, listen for a simultaneous transmission on the channel by another station, and then resume full transmitting power. The detection of a simultaneous transmission is annunciated to alert the first user that his transmissions may have been interferred with. Interruption of the first user's transmission may occur either periodically or at detected pauses between the first user's spoken words. The arrangement operates in conjunction with the conventional automatic gain control circuit of the first user's station.

38 Claims, 3 Drawing Figures

SIMULTANEOUS TRANSMISSION SIGNAL DETECTION SYSTEM

This application is a continuation-in-part of our pending application Ser. No. 928,825, filed on July 28, 1978 now abandoned.

BACKGROUND OF INVENTION

In a typical aircraft/ground station voice communication system, a controller located in a tower initiates voice transmission when he closes his key (presses the push-to-talk switch on his microphone). The communication is received by the radio station onboard an aircraft to provide information and instructions to the pilot of the aircraft.

During the voice communications from the controller to a pilot in the aircraft, it is presumed by the controller that the aircraft pilot is receiving and listening to his transmission. With the widespread use of squelch in receivers, there is no direct method now available for the pilot to determine that the message has been completed. The use of the term "over and out" is no longer practiced. Because of the vagaries of the language and the potential for misunderstanding on the part of the pilot as to when a message has ended, the voice procedures practice is simply not trustworthy. Therefore, it is possible that while the tower controller is continuing his transmission of further instructions to the aircraft, the pilot may himself pick up his own microphone and press his push-to-talk switch to start transmitting. On these occasions the pilot would be transmitting simultaneously during the time that the tower is transmitting.

The condition that may be created is that the tower may not know that the aircraft is not receiving that portion of the tower originated message transmitted during simultaneous transmission; or any of it, and the pilot of the aircraft does not know that there has been additional instructions or clearance information given to him while he was transmitting simultaneously with the tower.

SUMMARY OF INVENTION

The simultaneous transmission signal detection system according to the present invention operates in conjunction with a conventional radio transceiver to provide an automatic transmitter interrupt and detection of a simultaneously transmitted signal. The arrangement interrupts the radio transmission for a period of time so brief that the interruption can not ordinarily be detected by a human receiver of the interrupted transmission. During the interrupt time, which is typically 5 to 10 milliseconds long, the receiver section of a transceiver equipped according to the present invention is activated long enough to determine whether or not the communication channel to which the receiver is tuned, is in use by another transmitter. In the event the channel is found to be clear, the interrupt ends and the transmitter section is again activated. If a simultaneous transmission on the channel is detected, the arrangement provides an alarm function, such as an annunciation. The annunciation alerts the station operator that his transmission may be interferred with or completely blocked. Upon such annunciation, his continuing transmission is not interrupted permanently unless the operator decides to react to the alarm by interrupting his own transmission.

In aircraft communication with the ground stations a pilot may be attempting to transmit a message to the tower at the same time the tower is attempting to give him instructions. If both transmissions begin and end simultaneously it is impossible using conventional equipment, to tell that neither party received the other's transmission without the assistance of a third party who might have heard the incident, and can report it or might not. The lack of knowledge that a transmission has been blocked could result in extensive damage to equipment and loss of life. The use of the arrangement described herein in aircraft communication systems where the preferred embodiment could prevent a disaster, is most obvious; but the circuit of the present invention is not precluded from use in other applications where safety requires more certain communication. The other public safety areas that seem appropriate are police, rescue, and fire service delivery. In such services, a missed transmission ca cause confusion and delay that could lead to loss of property or life. The present invention is not intended as a substitute for proper radio operating procedure, but its incorporation into conventional radio stations can reduce or prevent the hazards that can result from procedures in present use.

OBJECTS

It is a principal object of the present invention to provide a circuit that gives an operator who is transmitting in a two-way communication system, information that a simultaneous transmission is occurring while he is transmitting.

Another object of the present invention is to provide such reliable information to prevent missed communication due to channel blocking by a simultaneous transmission.

Still another object of the present invention is to provide such information through electronic circuitry that is simple in operation and relatively inexpensive in cost.

Other objects and features of the present invention will become apparent from the following detailed description when taken in conjunction with the drawings in which:

DETAILED DESCRIPTION OF THE PREFERRED EMBODIMENT

The following description assumes the use of the simultaneous transmission signal detection system in conjunction with a radio transceiver circuit typical of those now in widespread use. The transceiver circuit assumed is of a design wherein the antenna system and transmit/receive mode circuits can be switched to enable mode changes in the time spans required by the present arrangement available. Separate receiving and transmitting devices with their individual antennas may be utilized.

Figure 1:
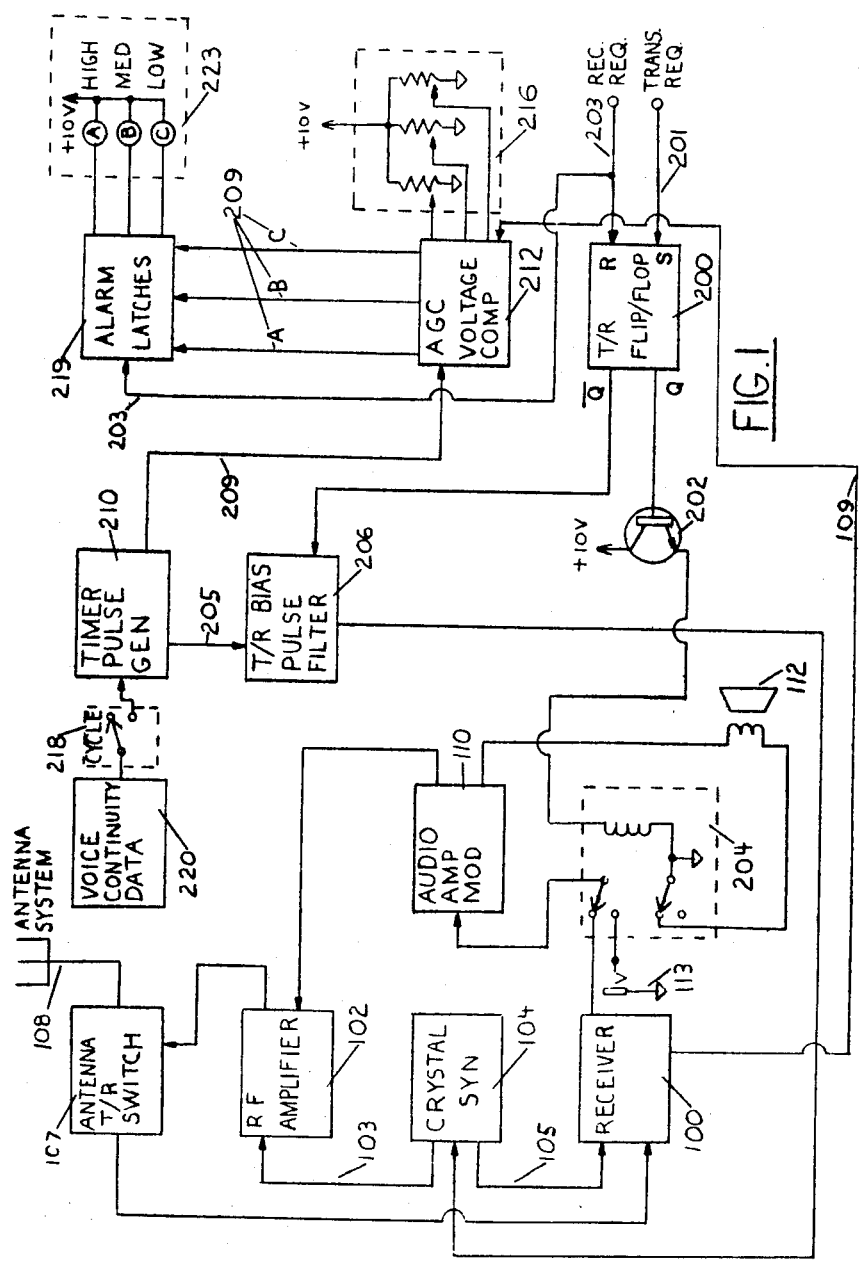
FIG. 1 is a simplified block diagram that schematically depicts the overall invention.

With reference to FIG. 1, the overall system is depicted in a block/schematic diagram.

In operation of the transceiver circuit, upon initiation of voice transmission a pulse is generated on line 201 and sent to the "set" input of the Transmit/Receive (T/R) flip/flop 200, setting its $\overline{Q}$ output to logic 1, +10 volts, and setting the Q output to logic 0. This constitutes the "transmit" state of flip/flop 200. In this transmit state the +10 volt signal from the "Q" output of T/R flip/flop 200, drives transistor 202 which, in turn, activates a relay coil of the transmit receive relay 204. Relay 204 disconnects the speaker 112 from the audio section 110 output. Relay 204 also disconnects the receiver section 100 from the audio section 110 input and via its contacts connects the transmitter microphone (not shown) through microphone jack 113 in its place. Relay 204 only controls the audio functions of the microphone and speaker 112. The relay 204 does not need to be activated in order for the transmitter RF amplifier 102 to be turned off or for the receiver section 100 to function.

Mode switching from receive to transmit for the receiver section 100 and the RF amplifier 102 is accomplished by changing the bias voltage to the output stages of the crystal synthesizer 104 coupled thereto via line 101.

When the input bias to the crystal synthesizer 104 is at zero volts, there is no local oscillator signal on line 105 to the mixer of receiver section 100. The RF drive signal on line 103 is active and, in turn, supplies an input to the RF amplifier section 102. The mode can be changed from transmit to receive by simply changing the input bias on line 101, to the crystal synthesizer 104. When this bias is switched from zero volts to +10 volts, the synthesizer output stage supplying drive to the RF amplifier 102 is turned off and the local oscillator signal on line 105 to the mixer of receiver section 100 is activated. The antenna system is effectively connected to the receiver input whenever there is no transmit level RF voltage on the antenna system 108-even though the audio section may still in the transmit mode. For example audio section 110 is not connected to speaker 112 until relay 204 is de-activated. The receiver section 100 becomes fully active in several milliseconds. The presence or absence of a received signal is determined by measuring the voltage on the automatic gain control (AGC) line 109.

The T/R bias pulse filter 206 serves to effect a smooth transition from transmit to receive by insuring that the bias voltage on line 101 contains a minimum of transient signals. Upon receiving a logic "0" signal from the $\overline{Q}$ output of T/R flip/flop 200, the T/R bias filter 206 smoothly integrates that signal to provide a 1 millisecond duration ramp from +10 volts down to 0 volts. This ramp signal is fed via line 101 to the crystal synthesizer 104. This ramp signal slowly biases on the transmitter RF drive of RF amplifier 102. When the $\overline{Q}$ output signal is switched back to logic 1, the signal from T/R bias pulse filter 206 is "ramped" back to a +10 volt output on the bias line 101. This filtering action slowly turns on the receiver local oscillator signal and turns off the RF drive. The purpose of the T/R bias filter 206 is to suppress interference that would be generated in sidebands if the power were suddenly applied and then removed from an RF amplifier in a transmitting system. The integrated voltage ramp is an effective substitution for a truly gaussian wave shape that would cause a minimum of high frequency overtones to be added as modulation to the carrier as it is turned on and off.

In order to end a transmission and return to the receive mode, releasing the transmit button (push-to-talk button) located on the microphone (not shown) generates a pulse on the receive request (REC. REG.) line 203 to reset the T/R flip/flop 200. In this way the T/R flip/flop 200 is reset into the receive mode, relay 204 is de-activated and the receiving local oscillator signal is activated from crystal synthesizer 104.

A timer and pulse generator circuit 210 generates a voltage pulse at a repetition rate of approximately once a second and of a duration of approximately five to ten milliseconds. This pulse is called the Transmit Interrupt Pulse and is present on line 205 and is coupled to the T/R bias pulse filter 206. Near the middle of the transmit interrupt time, a second pulse of one millisecond duration is generated. This one millisecond duration pulse is called the "AGC Sample Pulse" and is present on line 209 coupling the timer 210 to the AGC voltage comparators 212. When the T/R flip/flop 200 is in the transmit mode (i.e. $\overline{Q}$ output is logic 1 and Q is logic 0), as set by the transmit request pulse on terminal 201, the timer generated Transmit Interrupt Pulse will periodically (every second or so) be sent via line 205 to the T/R Bias pulse filter 206 which in turn alters the bias to the crystal synthesizer 104. The filtered bias Transmit Interrupt Pulse from synthesizer 104 will turn off the RF drive signal to RF amplifier 102 and turn on the receiver local oscillator signal to receiver 100.

After a stabilization time of around 3 or less milliseconds the AGC signal on line 109 from the receiver section 100 will have a voltage proportional to the strength of the signal present on the channel to which the receiver is turned. In essence, the final AGC signal level that would be induced responsive to an interferring signal is predicted at the end of this 3 millisecond time interval. After this stabilization time, the AGC voltage comparators 212 will compare the AGC voltage on line 109 with a preset level voltages established by interrupt sensitivity controls 216. If the signal present on line 109 does not exceed one of the preset levels from alarm sensitivity control 216, when the AGC sample pulse on line 229 is gated into the AGC comparator 212, then no signal will be present on the output of comparator 212 on 209A, B, or C. In this below alarm signal condition, the pulse on line 205 into T/R bias pulse filter 206 will time out to completion and the transceiver will return to the transmit mode by appropriate bias level change on the T/R Bias line 101.

In the event the AGC signal on lines 109 is at a level greater than that set by the alarm sensitivity controls 216A, B, or C, then the alarm signal on line 209A, B, or C is stored in the alarm latches 219 (Hi, Med, or Low) to indicate to the operator via alarm lamps 223A, B, or C the occurrence of signals exceeding present levels A, B, or C. This alarm storage latch 219 is reset by the receiver request pulse via line 203.

In this way the operator is alerted to the condition wherein his transmission is likely not being understood or is likely being interfered with, and permits the operator to exercise judgement as to whether he should momentarily cease transmission to hear what is being transmitted on his channel or wait until the second station completes transmission prior to the operator continuing his transmission. The alarm sensitivity controls 216 can be adjusted to supply three levels of reference to the AGC comparator 212 in order to indicate the relative strength of the interferring station. A weak station would set only the low alarm lamp 223C while the strong signal would latch on all three lamps in 223, A, B, and C. Alternatively, the strongest signal lamp only may be lit. In this way, the operator could decide whether or not to respond to the possible interference on his channel, based on the strength of the interference present.

The timing interval of the sampling action is arbitrarily determined by the timer 210 when the switch 218 is placed in the time cycle position. A typical interval proven to be effective has a general periodicity of the order of ½ second or one second.

In another and more refined embodiment, the timer command function of timer 210 is combined with that of a voice continuity data circuit 220. In this more refined embodiment, the timer 210 periodically initiates a desired interrogation of the presence of a carrier but the actual sampling is detained until suitable message gap occurs.

Figures 2, 3:
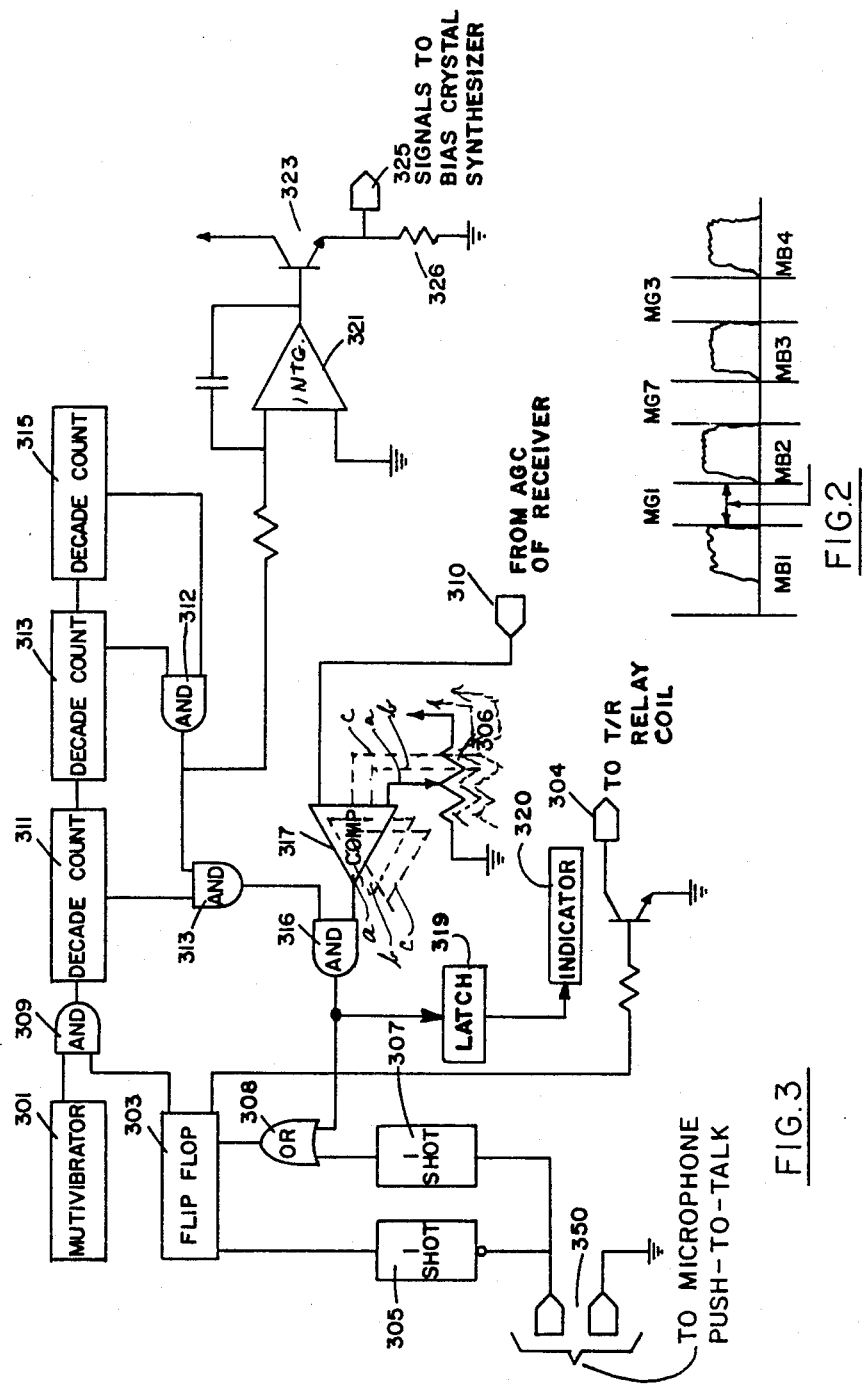
FIG. 2 is a graphical illustration of the waveform interrupt period utilized by the circuit of FIGS. 1 and 3.
FIG. 3 illustrates the circuit features of the preferred embodiment of the present invention.

The voice continuity data circuit 220 may provide a command function of sampling to occur in the interval when no message is being transmitted, such as would be represented by the voice wave form of FIG. 2. There is illustrated a voice modulated carrier with the intervals separating the voiced vocalized messages, such as, the words, "1,2,3,4". The intervals are represented generally by the message bit one (MB1), message bit two (MB2), message bit three (MB3), etc. and the message gaps shown as MG1, MG2, MG3, etc. The duration of the message gaps is characteristic of speech. Alternatively, instead of using an arbitrary time cycle, as represented in the timer 210 of FIG. 1, sampling may occur in the absence of message bit content. In which case there would be no incurrsion or errosion of the continuity or comprehensibility of the message being transmitted. Such an arrangement is accomplished by the circuit generally shown in FIG. 1 by voice continuity data apparatus 220.

The action in the receiver is such that the existence of a carrier during the interrupt interval, may be detected by very rapid sampling of an IF frequency by means of phase lock loop circuit. This would generally require in the order of 10 cycles of intermediate frequency carrier presence at 10 megahertz, a very short interval in relation to the sampling time.

It is a characteristic of the sampling period that the wave form of the turn-off and turn-on program should not be a square wave; more desireably, it should be a wave with soft edges so as to minimize adjacent channel interference due to harmonic content caused by the extended high frequency components of transient wave forms. Ideally, for minimum band width, the wave form edges would have a gaussian characteristic, but for practical embodiments a sine wave characteristic would probably be adequate. Other means of carrying this out might well be very high frequency, zero crossing detection, and other techniques well known to those skilled in the art.

With particular reference to FIG. 3 is illustrated the schematic circuit of the preferred embodiment of the transmitter interrupt system of the present invention. A transceiver of conventional design is assumed. A circuit card is made up with a timer serving the purpose of the transmitter interrupt cycle. This circuit includes free running multivibrator 301 operative at a frequency in the order of 1 kHz. The multivibrator 301 is normally gate off by the AND gate 309 until such time as a transmit condition would exist. In this embodiment the microphone push-to-talk button circuitry 350 is fed into a pair of one-shot multivibrators 305 and 307. In this way when the transmitter button is pushed, a single pulse is sent from circuit 305 to the flip/flop 303. This pulse is used to set the flip/flop 303 into the transmit mode.

In the transmit mode the Q output of the flip/flop 303 is high and the AND gate 309 passes clock pulses from multivibrator 301. The pulse from multivibrator 301 are counted by a counter chain including decode counters 311, 313, and 315. These decade counters have outputs of 1 through 10 available on their output terminals. In this way, pulse 1, pulse 8, or pulse 7 may easily be selected and found to be the width of one input clock pulse. From the first counter 311, the number 6 count was selected as an output pulse. Every time the number 6 pulse in a series of ten is passed, there is received a one mili-second pulse down to AND gate 313. This gate 313 also receives a 10 mili-second pulse once a second through gate 312, allowing one pulse at position 6 in the cycle to come through AND gate 313 every second. This pulse is of one mili-second duration.

Returning to the flip/flop 303, once set with a transmit request, it can be reset by release of the microphone push-to-talk button which sends a signal pulse to it's reset input. This reset pulse is sent by way of one-shot mutivibrator 307 and an OR gate 308. The AGC voltage comparator 317 has the level control signal coupled to its positive input and the automatic gain control voltage from receiver 100 of FIG. 1 coupled to its negative input. Therefore, at some period of time during transmission the transmitter will be interrupted for an interval of 10 milli-seconds of time, the receiver automatic gain control line is observed for one millisecond during this time to determine if there is a signal. If there is a signal on the automatic gain control line the output of 317 will be positive and that positive output will be coupled through AND-gate 316, stored in a latch 319 and displayed by an indicator 320. If it is desired to automatically shut off transmission when an interferring signal is detected, the output of AND-gate 316 is coupled to one input of OR-gate 308, as shown in FIG. 3. However, if it is desired to alarm only and leave the decision to the operator as to whether or not to interrupt his transmission, then the line from AND-gate 316 to OR-gate 308 is broken and then open input to OR-gate 308 is tied low or to the other input of OR-gate 308.

Control 306 and comparator 317 are shown as a single AGC level alarm comparator. In actual practice, three separate sets of controls 306 A, B & C, feed 3 comparators 317 A, B & C and the resulting alarm condition (high, medium or low) is stored in 3 separate latches and displayed on alarm indicators.

THe same counter chain including decade counters 311, 313, and 315 is programmed for a 10 milli-second time period during which to interrupt the transmitter. As the counter counts down and reaches decade one in the counter 313, it instigates a 10 milli-second time period that is gated with a 1/10 second pulse from counter 315 once every second. During this 10 milli-second time period, a square wave is fed into an integrator 321.

The integrator 321 serves to provide voltage adequate to bias off the transmitter RF stage and the modulator stage, so that neither the modulator nor the RF stage amplifier would have power applied during this 10 milli-second time. With the transition time-off and the trasition time backon, control voltage is smoothed by the integrator 321. The integrator 321, buffered by transistor 323, supplies sufficient current to adequately drive the bias stage that is used for switching the bias to crystal synthesizer 104 shown in FIG. 1.

A clock whose frequency was arbitrarily set about 1 kHz is gated on to count any time the transmitter is activated. The chain of counters 311, 313, and 315, sends out two different pulses. One pulse which is 1 milli-second wide, occurring once a second, and another pulse that is ten milli-seconds wide, occurring once a second. The first short pulse located in the middle of the second long pulse. This short pulse occurs during the time when the transmitter is switched off by the integrator 321. During the time that the one milli-second pulse occurs, the AGC voltage comparator 317 looks at the automatic gain control voltage in the receiver section 100 to see if the automatic gain control voltage is more than a predetermined voltage, set by the Alarm Sensitive Control 306. If the automatic gain control voltage does not exceed this level, an alarm signal occurs that is stored in latch 319, and displayed by the indicator. If more than one comparator, comparing more than one pre-set alarm level with the AGC voltage from receiver 100 can be used to latch and display a Low, Medium or High level interferring signal, only one such alarm circuit, 317, 319, 320 is illustrated to avoid confusion.

Although, there is shown and described specific embodiments of the present invention, it is to be understood modifications may be had without departing from the spirit and scope of the invention.

We claim:

1. A simultaneous transmission detection circuit for a voice communication system comprising:
means for disabling a first carrier signal transmitting means for an interval of time,
means for detecting one or more carrier signals exceeding predetermined amplitude levels from a second or more transmitting means,
said interval of disablement being of sufficient duration in time to permit said detection of said carrier signals but insufficient in duration of time to inhibit said voice communication; and
means for indicating said detected carrier signal to the operator of said first transmitting means.

2. The simultaneous transmission detection system of claim 1 wherein said means for disabling said first carrier signal further comprises means to aperiodically disable said signal.

3. The simultaneous transmission detection system of claim 1 wherein:
said means for detecting includes means for determining the level of one or more detected carrier signals from a second or more transmitting means including circuit means for generating a signal of a preset level and a comparator for comparing said level of said detected signals with said signal of a preset level, and
said means for indicating including annunciator means connected to the output of said comparator indicating whether said preset signal is exceeded.

4. The simultaneous transmission detection system of claim 1, wherein said detected carrier signal may comprise a single signal or a composite of two more more signals.

5. The simultaneous transmission detection system of claim 1 wherein:
said means for detecting includes means for determining the level of one or more detected carrier signals from a second or more transmitting means including circuit means for generating a plurality of signals of preset levels, and a comparator for comparing the levels of said detected signals with said signals of preset levels, and
said means for indicating includes an alarm for indicating to the operator of said first transmission means which of said plurality of preset level signals is exceeded by said detected signals.

6. The simultaneous transmission system of claim 1 wherein said disablement of the first transmitted signal is of a time period in the order of 5–10 milliseconds.

7. The simultaneous transmission detection system of claim 3 wherein:
said means for determining includes means for generating a pulse of substantially less duration than said period of disablement of said first carrier, near the mid-point of said disablement period, and whose amplitude is proportional to the level of the detected carrier signal, and said comparator includes means for comparing the amplitude of said generated pulse with said preset level signal, and
said annunciator includes means for indicating when said generated signal exceeds said preset level.

8. The simultaneous transmission detection system of claim 7 wherein:
said means for generating a pulse further comprises an AGC circuit, and,
said means for comparing includes means for measuring the level of said AGC voltage over a preset time period less than said time interval of disablement.

9. The simultaneous transmission detection system of claim 1 wherein said means for detecting the level of a detected carrier signal comprises:
an AGC circuit for generating an AGC voltage signal, and,
means for measuring the level of the AGC voltage after a preset time period following disablement of said first transmitting carrier.

10. The simultaneous transmission detection system of claim 1 wherein said means for disabling said carrier signal includes means for determining a break in normal speech pattern and disabling said transmitted carrier during said break.

11. In a communication system wherein multiple radio stations communicate with one another over a single channel, a method for indicating to the operator of a first station who is transmitting over the channel that there is a simultaneous transmission occurring on the channel by another user, possibly blocking or interferring with transmission by the first user comprising the steps of:
disabling the first station's transmission;
monitoring said communication channel for a signal above a predetermined threshold level;
annunciating an alarm in response to a signal exceeding said predetermined threshold level; and
resuming transmission by the first user.

12. A method according to claim 11 wherein said step of disabling comprises the step of disabling the first station's transmission at a predetermined periodic frequency.

13. A method according to claim 11 wherein said step of disabling comprises the step of disabling aperiodically the first station's transmission.

14. A method according to claim 11 wherein said step of disabling comprises disabling the first station's transmission at detected pauses between the first user's spoken word in voice communication.

15. A method according to claim 11 wherein said step of disabling comprises attenuating the output level of the carrier of the first station.

16. A method according to claim 14 wherein said step of disabling comprises attenuating the output level over an interval of time so as to approximate a gaussian curve of power shut down to thereby minimize the generating of spurious harmonic signals.

17. A method according to claim 15 wherein said step of disabling comprises attenuating the first station's transmission as a function of time wherein said function is portion of a sinusoidal curve.

18. In a communication system wherein multiple radio stations communicate with one another over a single channel, the improvement comprising:
means for disabling a first station's transmission;
means for detecting the presence of a signal on the communication channel;
means for determining whether said detected signal on the communication channel during the said period of interruption exceeds a predetermined threshold level;
means for annunciating an alarm condition whenever said predetermined threshold level is exceeded during an interruption period; and
means for returning to a transmitting state by said first station, whereby the operator of said first station is provided with an indication that another user is simultaneously transmitting on the channel possibly knocking or interferring with transmission by the first station.

19. An improvement according to claim 18 wherein said means for disabling comprises means for aperiodically attenuating said first station's transmission.

20. An improvement according to claim 18 wherein said means for disabling comprises means for attenuating said first station's transmission as a portion of a sinusoidal function over an interval of time.

21. An improvement according to claim 18 wherein said means for disabling comprises means for attenuating said first station's transmission with substantially a gaussian function over an interval of time.

22. An improvement according to claim 18 wherein said means for disabling said first station's transmission comprises means for periodically attenuating said first station's transmission.

23. An improvement according to either of claims 18 or 19 wherein said means for disabling comprises means for disabling the first station's transmission druing gaps in the modulation of said first station's transmission.

24. An improvement according to claim 23 wherein said gaps comprise the message gaps of ordinary speech.

25. An improvement according to claim 18 wherein said means for detecting comprises means for sampling an AGC signal of a receiver section of said first station.

26. An improvement according to claim 25 wherein the AGC sample taken by said means for sampling is proportional to the strength of said detected signal.

27. An improvement according to claim 25 wherein said means for determining comprises comparator means for comparing the AGC sample with a predetermined reference level.

28. An improvement according to claim 27 wherein said predetermined reference level is user adjustable.

29. A channel block monitor adapted to be coupled to a first radio station for determining the presence of a simultaneous transmission by a second radio station on a channel transmitted on by said first station comprising:
means for disabling a first station's transmission during a period of interruption;
means for detecting the presence of a singal on the communication channel;
means for determining whether said detected signal on the communication channel during the said period of interruption exceeds a predetermined threshold level;
means for annunciating an alarm condition whenever said predetermined thereshold level is exceeded during an interruption period; and
means for returning to a transmitting state by said first station, whereby the operator of said first station is provided with an indication that another user is simultaneously transmitting on the channel possibly blocking or interferring with transmission by the first station.

30. A channel block monitor according to claim 29 wherein said means for disabling comprises means for aperiodically attenuating said first station's transmission.

31. A channel block monitor according to claim 29 wherein said means for disabling comprises means for attenuating said first station's transmission as a portion of a sinusoidal function over an interval of time.

32. A channel block monitor according to claim 29 wherein said means for disabling comprises means for attenuating said first station's transmission with substantially a gaussian function over an interval of time.

33. A channel block monitor according to claim 29 wherein said means for disabling said first station's transmission comprises means for periodically attenuating said first station's transmission.

34. A channel block monitor according to either of claims 29 or 30 wherein said means for disabling comprises means for disabling the first station's transmission during gaps in the modulation of said first station's transmission.

35. A channel block monitor according to claim 34 wherein said gaps comprise the message gaps of ordinary speech.

36. A channel block monitor according to claim 29 wherein said means for detecting comprises means for sampling an AGC signal of a receiver section of said first station.

37. A channel block monitor according to claim 36 wherein said means for determining comprises comparator means for comparing the AGC sample with a predetermined reference level.

38. A channel block monitor according to claim 37 wherein said predetermined reference level is user adjustable.

* * * * *